United States Patent [19]

Bond, III

[11] Patent Number: 4,834,610

[45] Date of Patent: May 30, 1989

[54] WIND PROCESSING AIR TURBINE, AND METHODS OF CONSTRUCTING AND UTILIZING SAME

[76] Inventor: Frederick W. Bond, III, 4647 Cass Elizabeth, Pontiac, Mich. 48054

[21] Appl. No.: 8,635

[22] Filed: Jan. 29, 1987

Related U.S. Application Data

[63] Continuation-in-part of Ser. No. 855,932, Apr. 25, 1986, abandoned.

[51] Int. Cl.$^4$ .............................................. F03D 7/06
[52] U.S. Cl. ........................................ 415/3; 415/533; 415/907; 415/141; 416/60
[58] Field of Search ................... 415/2 R–4 R, 415/10; 416/3, 119, 60 A, 41 R, 132 B, 197 A, 111, 231 B; 310/330

[56] References Cited

U.S. PATENT DOCUMENTS

| | | | |
|---|---|---|---|
| 485,933 | 11/1892 | Herman | 416/119 |
| 537,494 | 4/1895 | Stevens et al. | 415/2 R |
| 588,572 | 8/1897 | Hardaway | 415/2 R |
| 640,901 | 1/1900 | Hardaway | 415/61 |
| 1,008,372 | 11/1911 | Seelye | 416/119 |
| 1,017,002 | 2/1912 | Kelly | 416/119 |
| 2,406,268 | 8/1946 | Terhune | 416/139 A |
| 2,515,446 | 7/1950 | Gravley | 310/330 |
| 3,942,909 | 3/1976 | Yengst | 416/132 B |
| 3,970,409 | 7/1976 | Luchuk | 416/60 A |
| 3,994,621 | 11/1976 | Bogie | 415/2 R |
| 4,047,834 | 9/1977 | Magoveny et al. | 416/119 |
| 4,142,822 | 3/1979 | Herbert et al. | 415/2 R |
| 4,408,956 | 10/1983 | Price | 416/119 |
| 4,486,143 | 12/1984 | McVey | 415/2 R |
| 4,546,264 | 10/1985 | Pinson | 290/54 |
| 4,551,631 | 11/1985 | Trigilio | 415/2 R |
| 4,571,152 | 2/1986 | Tatar | 415/4 R |

FOREIGN PATENT DOCUMENTS

| | | | |
|---|---|---|---|
| 145506 | 3/1950 | Australia | 416/197 A |
| 2612200 | 10/1977 | Fed. Rep. of Germany | 416/119 |
| 515331 | 3/1921 | France | 415/4 R |
| 2448049 | 10/1980 | France | 416/197 A |
| 67459 | 6/1977 | Japan | 416/60 R |
| 26642 | 2/1984 | Japan | 416/60 A |
| 49378 | 3/1984 | Japan | 415/3 R |
| 1025 | of 1908 | United Kingdom | 415/3 R |
| 170830 | 3/1922 | United Kingdom | 415/3 R |
| 188653 | 3/1923 | United Kingdom | 415/4 R |

*Primary Examiner*—Everette A. Powell, Jr.
*Attorney, Agent, or Firm*—Irving M. Weiner; Robert M. Petrik; Joseph P. Carrier

[57] ABSTRACT

The present invention discloses a windmill capable of utilizing a broad range of wind speeds, comprising, a central axial shaft, a first flywheel attached to the upper portion of said central axial shaft, a second flywheel attached to the lower portion of said central axial shaft, a plurality of rotor blades operably connected to said first flywheel and said axial shaft, a supporting structure for rotatably supporting said shaft, a top structure and a base structure, a plurality of stator blades movably fitted between said top structure and said base structure, said stator blades being capable of rotational, inward and outward movement relative to said axial shaft, and a plurality of wind processing blades rotatably fitted between said top structure and said base structure.

2 Claims, 2 Drawing Sheets

WIND PROCESSING AIR TURBINE, AND METHODS OF CONSTRUCTING AND UTILIZING SAME

This is a continuation-in-part of application Ser. No. 855,932 filed Apr. 25, 1986, now abandoned.

BACKGROUND OF THE INVENTION

1. Field of the Invention

The present invention relates generally to windmills, and more particularly to a novel design of a windmill which generates electricity regardless of the speed of the wind.

Historically, windmills have been used for a miltitude of purposes, but generally to do mechanical work or to provide electricity by having their mechanical output coupled to a generator. The generation of electricity from windmills is presently economically feasible at today's energy prices. Therefore, there is great interest in improving a windmill's ability to deliver electricity.

2. Description of Relevant Art

The relevant art is exemplified by: Cleland U.S. Pat. No. 204,481 entitled "WIND-ENGINE"; Smith U.S. Pat. No. 232,558 entitled "WIND WHEEL"; Wood et al. U.S. Pat. No. 324,510 entitled "WIND ENGINE"; Hardaway U.S. Pat. No. 640,901 entitled "WIND AND WATER MOTOR"; Ebert U.S. Pat. No. 1,299,151 entitled "COMBINED WINDMILL AND AIR COMPRESSING MECHANISM"; Hakkarinen U.S. Pat. No. 3,473,038 entitled "WIND DRIVEN GENERATOR"; Yengst et al. U.S. Pat. No. 3,942,909 entitled "VERTICAL AXIS FLUID DRIVEN ROTOR"; Luchuk U.S. Pat. No. 3,970,409 entitled "WIND POWER AND FLYWHEEL APPARATUS"; Baumgartner et al. U.S. Pat. No. 4,012,163 entitled "WIND DRIVEN POWER GENERATOR"; Tackett U.S. Pat. No. 4,118,637 entitled "INTEGRATED ENERGY SYSTEM"; Cymara U.S. Pat. No. 4,260,325 entitled "PANEOMONE WIND TURBINE"; Tuley U.S. Pat. No. 4,276,816 entitled "WIND PROPELLED FAN"; Retz U.S. Pat. No. 4,365,929 entitled "VERTICAL WIND TURBINE POWER GENERATING TOWER"; Piston U.S. Pat. No. 4,546,264 entitled "RELATING CELLULAR ENERGY GENERATING AND STORAGE DEVICE"; Australian Pat. No. 145,506; French Pat. No. 2,448,049; French Pat. No. 900,038; West German Pat. No. 2,612,200; Japanese Pat. No. 50-132459; and Japanese Pat. No. 57-135149.

The attempts at solving the problem of what speeds are preferred for generating electricity have generally centered upon two basic design features: designing windmills which generate electricity only at relatively low speeds of wind; and designing windmills which generate electricity only at high speeds of wind. Both of these solutions are inadequate to provide maximum electrical generating capacity as they will most certainly result in a major portion of the available wind power not being utilized. Importantly, the present art fails to utilize wind at its maximum potential because of deficiencies in design and construction.

SUMMARY OF THE INVENTION

The present invention reveals novel design features for a windmill which will allow it to make maximum use of all speeds of wind, and with wind from all directions, comprising: a central axial shaft, a first flywheel attached to the upper portion of said central axial shaft, a second flywheel attached to the lower portion of said central axial shaft, a plurality of primary turbine blades, a lower supporting frame running between said upper flywheel and said turbine blades, an upper supporting frame running between said shaft and said turbine blades, said blades being each provided with a bi-directional turbine blade and a plurality of piezoelectric benders, a top member and a base member, a plurality of stator blades movably attached between said top member and said base member, said stator blades being attached so as to provide inward and outward movement relative to said central axial shaft which is being turned when said rotor blades are caused to rotate by the force of wind exerted against them, said wind being directed thereon by said stator blades, and a plurality of wind processing blades rotatably mounted between said top member and said base member.

This windmill further comprises an upper bearing support operably disposed upon said central axis, split rings operably engaged with said central axial shaft and said upper bearing support which rests upon said rings, braking means which operably engage with said central axial shaft for controlling the rate of rotation of said shaft, a lower bearing support attached to the lower portion of said central axial shaft, and electrical generating means operably engaged with said central axial shaft.

The present invention contemplates being usable over a broad range of wind speeds. This is a result of utilizing the wind processing blades and the stator blades which direct wind into the primary turbine blades and its associated wind-directing and wind-passing members, and further a result of the fact that the windmill will always possess a high pressure side and a low pressure side which will vacuum wind through, thereby additionally using the wind as its exits the windmill. Additionally, because the windmill employs the use of flywheels which are liquid dynamic in nature, meaning that they contain liquid which at low speeds stays near the central axial shaft, but at higher speeds, drains outward as the windmill rotates faster, the windmill has the ability to be rotated by winds of either low or high speed.

It is an object of the present invention that all electrical output generated through the engagement of electrical generating means with said central axial shaft will be characterized by an alternating current output to be rectified at some later point in time, but most likely after it has been stored in batteries and when it is drawn from said batteries.

DETAILED DESCRIPTION OF THE PREFERRED EMBODIMENT

Figure 1:
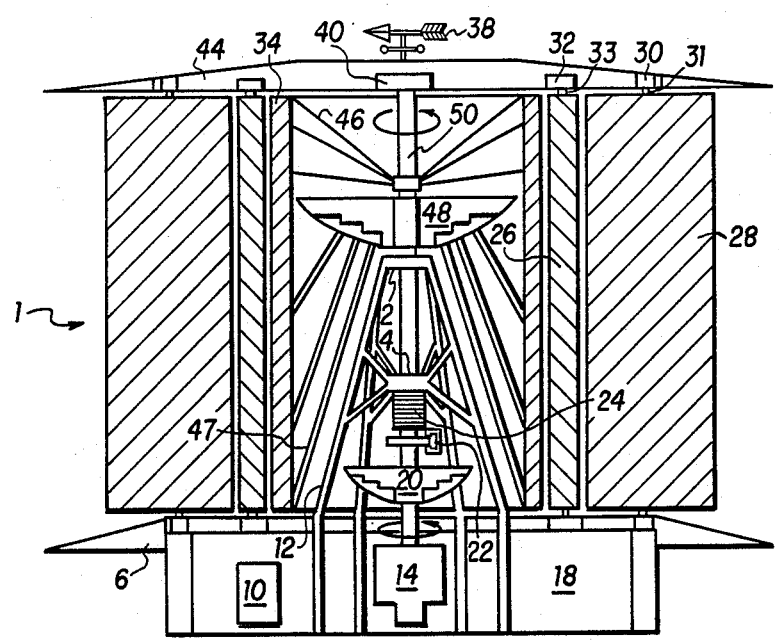
FIG. 1 is a vertical view taken along the approximate cross-section of the invention exposing many of the operative elements thereof.

FIG. 1 shows the invention, generally indicated by "1", in a preferred embodiment, exposed so as to reveal both internal and external elements thereof. While the configuration of the invention according to FIG. 1 is preferred, it is envisioned that alternative configurations of the present invention may be effectively employed without deviating from the invention as envisioned.

The exposed view of invention 1 in FIG. 1 discloses the principle elements of the invention according to the preferred embodiment. The central element of the invention, axial shaft 50, resides vertically in relation to the position of invention 1. Preferably, but not exclusively, there is provided on the shaft a plurality of flywheels. While it is envisioned that the flywheels may be conventional, according to the preferred embodiment there is provided a pair of dynamic flywheels, comprising upper dynamic flywheel 48 and lower dynamic flywheel 20.

Figure 5:
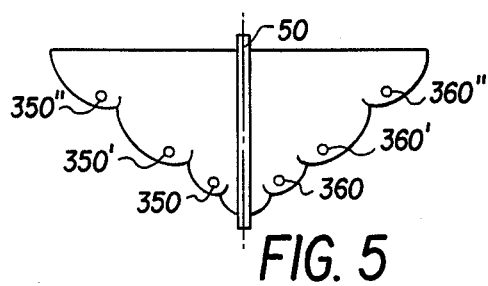
FIG. 5 is a cross-sectional view of the interior of the liquid dynamic flywheel.
Figure 6:
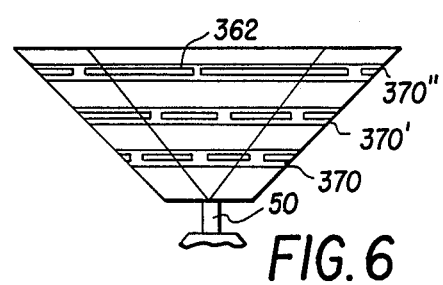
FIG. 6 is a side view of the dynamic flywheel with the outer layer of the flywheel body removed to expose the bleed holes provided in the horizontal fluid barriers for draining back fluid contained therein.

The construction of the dynamic flywheels is best seen in FIGS. 5 and 6. Referring first to FIG. 5, there is shown a cross-sectional view of a flywheel according to the present invention. The flywheel has a plurality of concentric levels of increasing diameter, the level of the smallest diameter placed lowest in relation to axial shaft 50. According to the preferred embodiment, there is shown a flywheel body 302 having three concentric levels 350, 350', 350''. Also according to the preferred embodiment there is provided a preselected amount of fluid within the flywheel body 302, generally indicated at its possible positions 360, 360', 360'' on levels 350, 350', 350''. Referring now to FIG. 6 the dynamic fly wheel according to this invention is illustrated with its outer layer removed so as to disclose further details of this aspect of the invention. Specifically, levels 350, 350', 350'' are further provided with horizontal fluid barriers 370, 370', 370''. Provided in the fluid barriers are a plurality of openings to allow the passage of fluid therethrough. While these openings may be of any effective configuration, they are here illustrated as being horizontal elongated slots 362.

Referring now back to FIG. 1, there is shown primary turbine blades 34, operatively attached to upper dynamic flywheel 48 by means of a support structure. According to the preferred embodiment, this structure is provided as lower blade support structure 47. Additional support of turbine blades 34 is provided by upper blade support structure 46, operatively provided between turbine blades 34 and shaft 50.

Axial shaft 50 is rotatably mounted in an appropriate structure having a plurality of support bearings and its further provided with a generator means for converting wind power into electrical power. According to the preferred embodiment, shaft 50 is rotatably supported by upper turbine base bearing 2 and lower turbine base bearing 4. These bearings are supported themselves by a support assembly fixed to a base member. According to the preferred embodiment, turbine support assembly 12 is fixably attached to lower support and housing structure 18. At or about the lowermost portion of vertical shaft 50 is provided generator means 14. For additional support of axial shaft 50, additional support members may be provided. For example, there is provided according to this embodiment upper structural support 40 which, while not necessarily a supporting bearing, does provide the preferred additional support.

Additionally provided on axial shaft 50 are split rings 24 which support lower turbine base bearing 4. Rotational movement of the axial shaft may at times be preferentially slowed, stopped, or entirely restricted. Accordingly, a braking means should be provided. According to the preferred embodiment, rotational movement of shaft 50 is stopped, slowed, or restricted entirely by means of disc and disc brake assembly 22, thus allowing controlled speed or complete stoppage for maintenance.

The invention according to the preferred embodiment has a top which acts as a roof, a positioning member, and a means of directing wind movement. Although this can be of any effective design, according to the preferred embodiment top 44 has downwardly-angled edges which assist in diverting effective passage of wind over the top of the invention while concurrently assisting to more effectively direct wind into the invention itself. For a similar purpose, there is preferably provided but not necessarily, downwardly-angled flanges 6 to lower structural support and housing 18.

In addition to top 44 and flanges 6, wind is effectively directed into and through invention 1 by means of a plurality of blades provided about axial shaft 50 and primary turbine blades 34. While it is envisioned that a number of means may be employed, there is provided according to the preferred embodiment at least two sets of directing blades, one set being generally characterized as outer blades and the other set inner blades. Specifically provided are stator blades 26 (inner blades) and wind processing blades 28 (outer blades). These blades function to direct wind into and through invention 1.

Wind processing blades 28 are pivotally provided between top 44 and lower support and housing structure 18 by means of wind processing blade pivotal shafts 31. By means of wind processing blade position drives 30, wind processing blades 28 may be rotated as desired to enhance both wind flow into and out from the central area of invention 1. Additionally, wind processing blades 28 may be rotated so as to entirely enclose the other blades of the invention, as is more fully described below.

Stator blades 26 function in a more complex manner. They too are provided between top 44 and lower support and housing structure 18 by means of stator blade shafts 33. Additionally, the movement of stator blades 26 are adjusted by means of stator blade position adjustment drives 32 which each independently controls the positioning of its associated stator blades 26. This control, as well as the control of the positioning of the outer wind processing blades 28 and the control of electricity to the piezoelectric benders 206, 208 and 226, is all controlled by computer. Screws assist in the radial adjustments of the stators blades 26. The electrical wiring leading to the piezoelectric benders is passed through the split rings. In addition to rotational movement, stator blades 26 are capable of radial inward and outward movement relative to shaft 50, this motion best illustrated by directions generally indicated by 118 in FIG. 2. This rotational and in-and-out movement provides a more efficient means by which wind is passed into and through the invention.

Finally, in FIG. 1, there is preferably, but not necessarily, provided wind speed and direction indicator 38 and an access to turbine base housing door 10.

Figure 2:
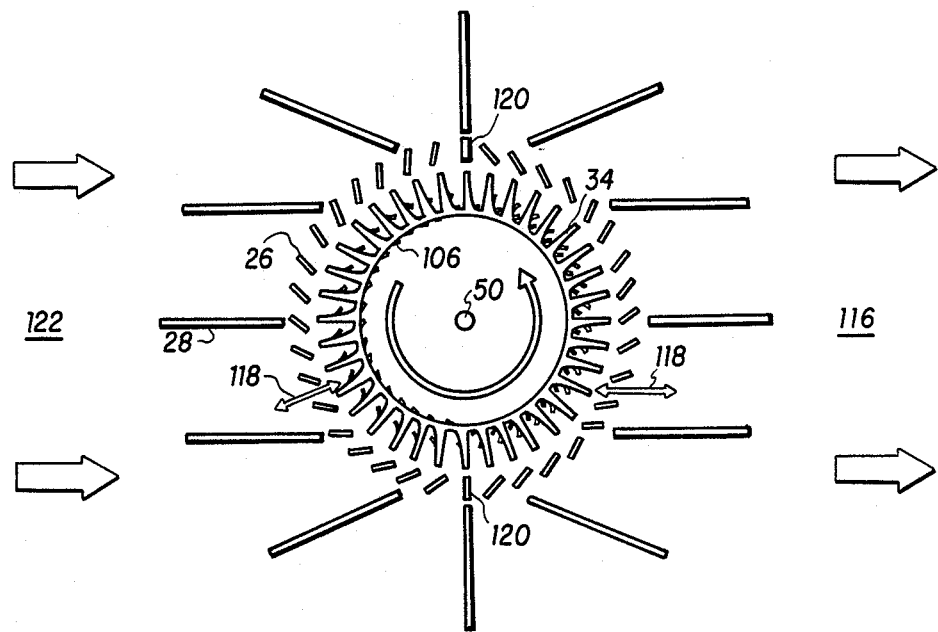
FIG. 2 is a top plan view of the invention utilizing arrows to indicate the direction of the wind.

Referring now to FIG. 2, there is shown a top plan view of the invention utilizing indicating arrows to show the direction of the wind. As illustrated, the wind enters from the left side, the high pressure side generally indicated by 122, and exits to the right, at the low pressure side, generally indicated by 116. A plurality of wind processing blades 28 direct the movement of the wind into the through the invention. The blades 28 may be preferentially moved as described above with respect to FIG. 1 so as to maximize utility of the movement of wind. Further enhancing this movement are stator blades 26 which are also capable of movement as described above with respect to FIG. 1 so as to provide maximum movement of the wind. Preferably, but not necessarily, two of these blades, blocking blades 120, act to block the wind at preferred places, so as to further enhance the efficient movement of wind.

Additionally provided are primary turbine blades 34 which are fixably attached to axial shaft 50 as described above with respect to FIG. 1. To enhance the wind utilization characteristics of turbine blades 34, each blade is additionally provided with turbine bi-directional blade 106.

Figure 3:
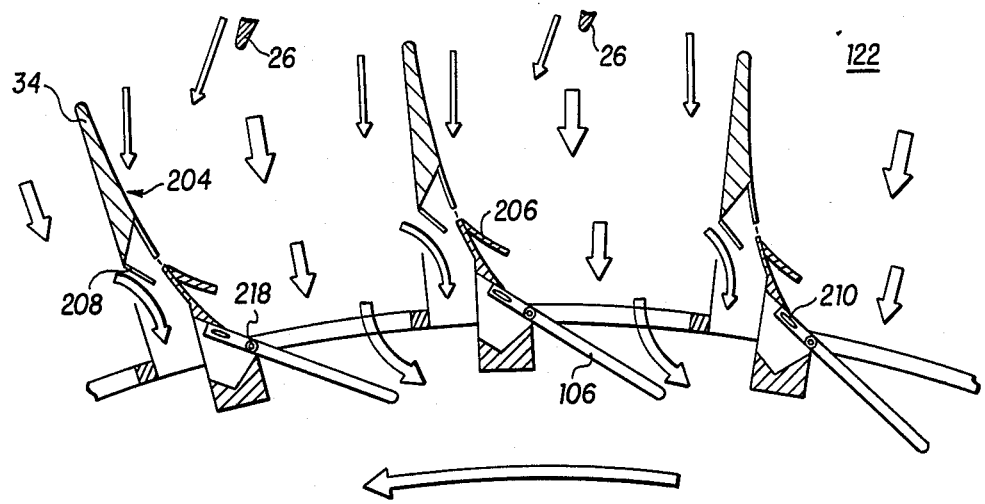
FIG. 3 is a detailed top plan view showing a section of the primary turbine blade assembly again utilizing arrows to indicate the direction of the wind.
Figure 4:
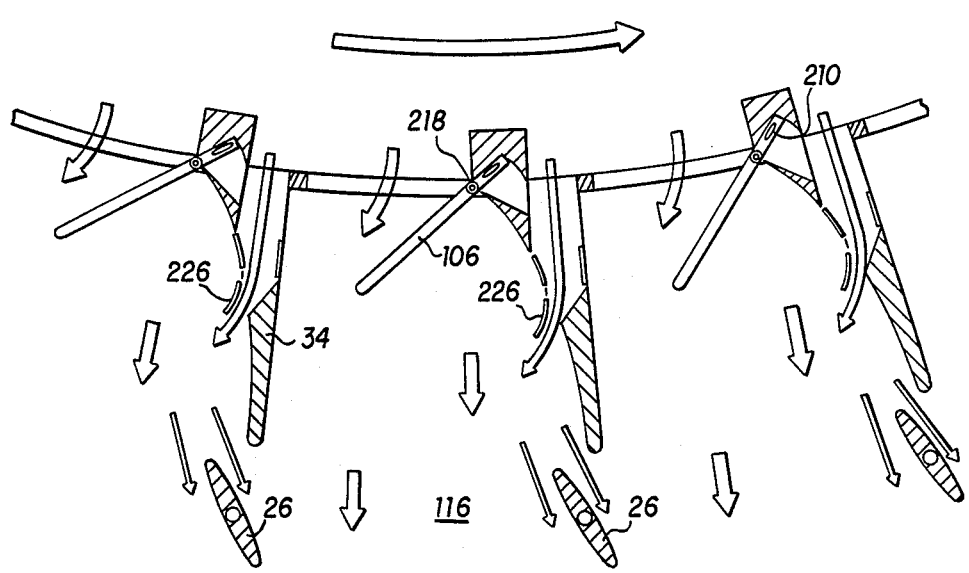
FIG. 4 is also a detailed top plan view showing a section of the invention utilizing arrows to indicate the wind exiting the turbine blade assembly.

The relationship between the primary turbine blades 34, their associated bi-directional blades 106 and other features is more clearly seen in FIGS. 3 and 4.

Referring first to FIG. 3 which indicates a high pressure side generally indicated by 122, there is shown a plurality of primary turbine blades 34. The relationship of these blades to the stator blades 26 is indicated. Preferably, but not exclusively, each primary turbine blade 34 is fitted with a bi-directional turbine blade 106. To prevent the build-up of accumulated pressure at the base of primary turbine blade 34, a build-up which reduces the efficiency of the rotational movement of blades 34, which, in effect, would be slowed by the capture of wind, bi-directional tubine blades 106 are pivotable at pivot points 218. This pivoting movement is enhanced by the presence of one or more counterweights 210. When primary turbine blades 34 are positioned on high pressure side 122, bi-directional turbine blades 106 pivot open, so as to allow passage of air thereby as indicated by the directional arrows provided, thus reducing or eliminating an undesirable back-up of air pressure.

Wind passage and direction is critical to the efficient operation of windmills. Accordingly, wind pressure edges 204 of primary turbine blades 34 are provided with high pressure piezoelectric deflector benders 206 which are comprised of material exhibiting the piezoelectric effect, i.e., the material can be distorted through selective and controlled input of electrical pulses. Said distortion directs the wind to pass by bi-directional turbine blades 106, thereby increasing the efficiency of the present device. Furthermore, to allow wind passage, a high pressure piezoelectric inlet bender 208 is provided on the back side of each primary turbine blade 34.

Referring now to FIG. 4, there is shown a plurality of primary turbine blades 34 and related members. According to this view, there is shown a low pressure side, generally indicated by 116, which indicates the passage of air from the invention as illustrated by the directional indicators provided. The bi-directional turbine blades 106 are pivoted in the direction opposite that shown in FIG. 3 to allow the passage of air from the invention. Additionally, low pressure outlet piezoelectric benders 226 are provided to facilitate more efficient movement of wind.

In operation, the windmill receives incoming wind at its high pressure side 122. The wind processing blades 28 and stator blades 26 are adjusted so as to maximize the flow-through of air, as are the piezoelectric devices provided on primary turbine blades 34, all of which are remotely operated by means known in the art. The fluid-containing flywheels 20, 48 provide a harmonic stabilizing or dampening effect. The fluid is allowed to proceed, from level to level, through openings 362 as speed dictates. Power is generated by generator means 14 as shaft 50 and its associated primary turbine blades 34, flywheels 20, 48, and support structures 46, 47 rotate as a unit. Braking or slowing is accomplished mechanically by operation of disc brake assembly 22.

When not in use or when preferred, wind processing blades 28 may be rotated by means of wind processing blade position drives 30 so as to effectively enclose the operating elements of the invention. To further enhance the energy-producing characeristics of the invention, the outer sides of wind processing blades 28 are preferably, but not necessarily, provided with solar energy collecting devices (not shown).

The invention described above with reference to the attached figures is not meant to limit the interpreting of the claims to any particular embodiment of the invention claimed. Furthermore, it is contemplated that various modifications may be made to the invention while still remaining within the scope of what is claimed below.

I claim:

1. A windmill capable of utilizing a broad range of wind speeds, comprising:
    a central rotating axial shaft;
    a first flywheel fixed to the upper portion of said shaft;
    a second flywheel fixed to the lower portion of said shaft;
    said flywheels being disposed in a fluid;
    said flywheels being comprised of concentric, multiple levels of diameters of increasing size, the smallest diameter placed lowest in relation to the shaft;
    a plurality of rotor blades operably attached to said first flywheel and said shaft by means of a support structure;
    said rotor blades comprised of primary turbine blades and bi-directional turbine blades;
    said primary turbine blades being provided with a plurality of flexible flaps for directing and permitting passage of fluid;
    said bi-directional turbine blades being provided with one or more counterweights and being pivotable in relation to each said primary turbine blade;
    a rotating shaft support structure supporting said axial shaft at a plurality of points between said first flywheel and said second flywheel and fixed upon a base member;
    said axial shaft being rotatable upon its axis when fluid is exerted against said turbine blades operably attached thereto;
    an external support and housing structure, having a top structure angled downwardly toward its edges, a bottom structure angled downwardly toward its edges, a plurality of supports therebetween, and said base;
    a plurality of vertical stator blades movably fitted between said top structure and said bottom structure for inward and outward movement relative to said shaft;

each said vertical stator blade being fitted at its uppermost end with a position adjustment drive; and a plurality of vertical wind processing blades pivotally fitted between said top structure and said bottom structure.

2. A windmill according to claim 1, wherein:
each of said flexible flaps is formed from a material which exhibits a piezoelectric effect and is capable of controlled distortion.

* * * * *

UNITED STATES PATENT AND TRADEMARK OFFICE
CERTIFICATE OF CORRECTION

PATENT NO. : 4,834,610

DATED : May 30, 1989

INVENTOR(S) : Frederick W. Bond, III

It is certified that error appears in the above-identified patent and that said Letters Patent is hereby corrected as shown below:

```
Column 1, line 15, change "miltitude" to --multitude--;
          line 44, change "Piston" to --Pinson--.
Column 2, line 37, change "its" to --it--.
Column 3, line 56, change "its" to --is--.
Column 4, line 57, change "stators" to --stator--.
Column 5, line 8,  change "the" (first occurrence) to --and--;
          line 38, change "tubine" to --turbine--.
Column 6, line 21, change "characeristics" to --characteristics--.
```

Signed and Sealed this

Thirteenth Day of February, 1990

*Attest:*

JEFFREY M. SAMUELS

*Attesting Officer*     *Acting Commissioner of Patents and Trademarks*